(No Model.)
P. ENGLEHART.
SULKY SCRAPER.
No. 281,986. Patented July 24, 1883.
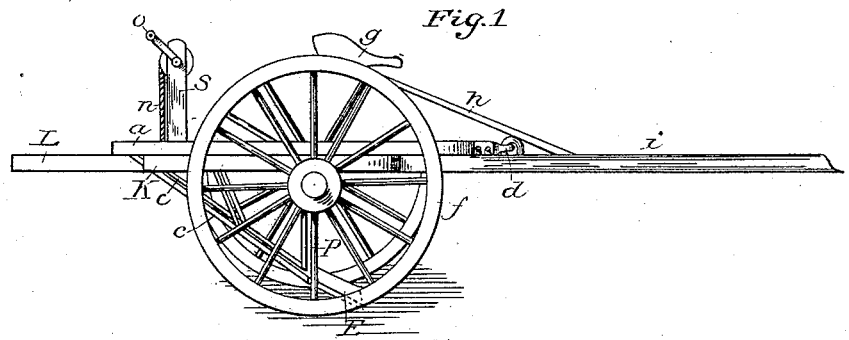
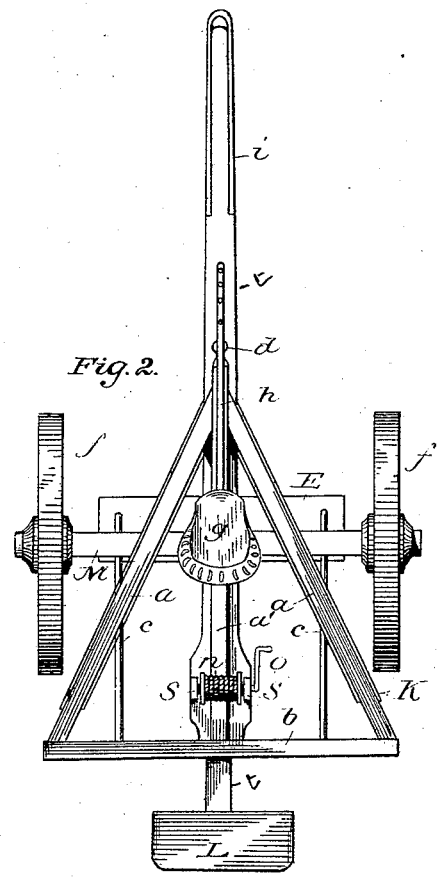
Attest
L. W. Lucy
D. H. Mead
Inventor
Philip Englehart
by Ellis Spear
Atty

UNITED STATES PATENT OFFICE.

PHILIP ENGLEHART, OF STANISLAUS COUNTY, CALIFORNIA.

SULKY-SCRAPER.

SPECIFICATION forming part of Letters Patent No. 281,986, dated July 24, 1883.

Application filed October 15, 1881. (No model.)

*To all whom it may concern:*

Be it known that I, PHILIP ENGLEHART, of Stanislaus county, in the State of California, have invented certain new and useful Improvements in Sulky-Scrapers; and I do hereby declare that the following is a full, clear, and exact description thereof, reference being had to the accompanying drawings, and to the letters of reference marked thereon, making a part of this specification.

My invention relates to an improvement in wheeled scrapers; and it consists in certain improved means of raising, lowering, and adjusting the positions of the scraper-blade, and in the various combinations of the operative parts, as fully hereinafter described.

In the drawings, Figure 1 is a side, and Fig. 2 a top, view.

The scraper-frame is carried on wheels $f\ f$, having an axle M, these parts being of ordinary construction.

Upon the axle is supported a beam, $t$, the forward extension of which forms the tongue, and which extends centrally back beyond the wheels and terminates in a platform, L. (See Fig. 2.) Beams K K are bolted rigidly on opposite sides of the central beam, just forward of the wheels, and extend back diagonally, forming a V-shaped frame supported by the axle and carrying-wheels.

In the rear of the wheels the beam $t$ is somewhat broadened, and in such beam are mortised or otherwise secured standards S S, forming bearings for a windlass or drum adapted to be operated by a hand-crank, O.

The scraper-blade is carried upon an adjustable V-shaped frame, consisting of a central beam for which the standards S S form a guide, side bars, $a\ a$, and a rear cross-bar, $b$, all bolted firmly together. The forward acute angular end of the V-shaped frame is provided with an eye which engages with a staple on the tongue $i$, and forms a universal joint, permitting the frame to move either vertically or horizontally. The side bars, $a\ a$, of the frame rest upon the side bars, K K, of the corresponding rigid frame before described. This, however, is the limit of motion of the frame, and in ordinary use the two frames would not be in contact at the rear end.

The scraper-blade E is secured upon arms $c\ c$, which are connected to the rear end of the movable frame, and extend forward, so as to bring the scraper slightly in front of a vertical line drawn from the axle to the ground. The exact position of the blade, however, is not material. It may be necessary to brace the arms $c$, as shown in Fig. 1, and it would usually be done. A rope or chain, $n$, wound on the drum or windlass is attached to the beam $a'$, and it is thus evident that the movable frame may be raised, lowered, or held by means of the crank. The platform L is a convenient position for the workman who manages the scraper. When the frame is raised the scraper-blade moves backward and upward on the arc of a circle.

In operation, the scraper is lowered to the desired point for work and the team started. The earth is raised on the blade, but is prevented from passing over it by a shield, $p$, attached to the axle, which extends down to and in contact with the scraper, as shown in Fig. 1. When sufficient earth has been gathered, the scraper is raised by means of the windlass and drawn back, while the shield $p$ acts as a scraper and clears the earth from the blade E, depositing it in a pile in front of such blade and preventing any clogging. This feature is of great advantage, as the scraper is kept free from earth, which, when damp and moist, would adhere to the metal scraper and could not sometimes be loosened by simply raising the latter.

A driver's seat, $g$, may be mounted on a support, $h$, as shown.

Having thus described my invention, what I claim is—

1. In a sulky-scraper, the combination, with a lower rigid frame mounted upon the axle of the carrying-wheels, of an upper movable frame carrying the scraper, pivoted at its forward end to the fixed frame, and adapted, when at its lowest position, to rest upon and be supported by said fixed frame, and means, substantially as described, for elevating the rear end of the pivoted frame above the fixed frame.

2. The combination, with the fixed frame having standards S, of the frame having center beam, $a'$, such frame being pivoted on top of the fixed frame, and adapted to be raised and lowered.

3. The combination, with the scraper-blade, of an independent guard or shield, P, suspended from the axle of the carrying-wheels.

4. In combination, the movable frame, the arms $c\ c$, supporting the scraper E, means for raising said frame and scraper, and the guard or shield P, substantially as and for the purpose set forth.

In testimony that I claim the foregoing I have hereunto set my hand this 30th day of September, 1881.

PHILIP ENGLEHART.

Witnesses:
J. J. SCRIVNER,
GEORGE L. HOOD.